US008462168B2

(12) United States Patent
Shih

(10) Patent No.: US 8,462,168 B2
(45) Date of Patent: Jun. 11, 2013

(54) DECOMPRESSION SYSTEM AND METHOD FOR DCT-BASE COMPRESSED GRAPHIC DATA WITH TRANSPARENT ATTRIBUTE

(75) Inventor: Chih-Chung Shih, Hsinchu (TW)

(73) Assignee: Sunplus mMedia Inc., Hsinchu (TW)

( * ) Notice: Subject to any disclaimer, the term of this patent is extended or adjusted under 35 U.S.C. 154(b) by 812 days.

(21) Appl. No.: 12/591,616

(22) Filed: Nov. 25, 2009

(65) Prior Publication Data

US 2010/0128059 A1 May 27, 2010

(30) Foreign Application Priority Data

Nov. 26, 2008 (TW) ............................... 97145758 A

(51) Int. Cl.
*G06T 9/00* (2006.01)

(52) U.S. Cl.
USPC ........... 345/555; 345/589; 345/592; 345/604; 345/549; 382/162; 382/167; 382/232; 382/244; 382/248; 382/250

(58) Field of Classification Search
None
See application file for complete search history.

(56) References Cited

U.S. PATENT DOCUMENTS 5,629,780 A * 5/1997 Watson ......................... 382/250
5,949,428 A * 9/1999 Toelle et al. .................. 345/589

* cited by examiner

*Primary Examiner* — Antonio A Caschera
(74) *Attorney, Agent, or Firm* — Bacon & Thomas, PLLC

(57) ABSTRACT

A decompression system for DCT-base compressed graphic data with transparent attribute includes a memory to store a compressed graphic data and a compressed mask data; a controller to read the compressed graphic data and the compressed mask data out of the memory; a first decompressor to decompress the compressed graphic data and generate a first color space image signal; a color space transformation device to transform the first color space image signal into a second color space image signal; a special color signal storage to store a plurality of special color signals; a second decompressor to decompress the compressed mask data and generate a select signal; and a first multiplexer to select the second color space image signal or a special color signal to output based on the select signal, wherein each special color signal indicates a different level of transparent attribute.

20 Claims, 3 Drawing Sheets

DECOMPRESSION SYSTEM AND METHOD FOR DCT-BASE COMPRESSED GRAPHIC DATA WITH TRANSPARENT ATTRIBUTE

BACKGROUND OF THE INVENTION

1. Field of the Invention

The present invention relates to the technical field of image decompression and, more particularly, to a decompression system and method for discrete cosine transform (DCT)-base compressed graphic data with transparent attribute.

2. Description of Related Art

FIG. 1 is a block diagram of a typical game application platform. In order to save the computation and bandwidth on a 2D or 3D game application platform, a sprite image and a background image are pre-coded and pre-stored in a memory 110. When the rendering engine (RE) 130 is to read the spite image and the background image, a decompressor 120 decodes the sprite image and the background image. The rendering engine 130 performs an image processing, such as an alpha blending, on the sprite and background images. Next, the rendering engine 130 stores the image-processed RGB values in a frame buffer 112. A display 140 reads the corresponding data from the frame buffer 112 and displays the sprite image and the background image. For coding the sprite and background images, in addition to a variable run length (VRL) coding, the method commonly uses a color lookup table (CLUT) or Huffman coding.

When the rendering engine 130 stores the data in the frame buffer 112 by means of RGB values, the image corresponding to the data can be further coded. By means of a real-time rendering and graphic image display system, the prior art uses the CLUT, i.e., the date written in the frame buffer 112 by the rendering engine 130 is not the RGB values anymore, and instead an index base. For example, if one image can be representative of 256 colors only, the data required for being written to the frame buffer 112 can be representative of 8-bit index. For displaying the image, the CLUT is searched based on the index for obtaining the corresponding RGB data. The RGB data can be 16 or 24 bits. However, such a way has a serious disadvantage of the limited display color types.

In the 2D and 3D game platforms, the rendering engine 130 requires a transparent attribute description in order to superimpose the sprite and background images or perform the alpha blending. As shown in FIG. 2, a superimposed image 230 is generated when the sprite image 210 and the background image 220 are superimposed. A part of the road of the background image 220 is blocked in the superimposed image 230. Accordingly, a part of the outer of the car image (indicated by 240) in the dotted is defined as a transparent color, so the partial road of the background image 220 in the superimposed image 250 is not blocked.

However, since the sprite and background images have the transparent attribute, it is not suitable for a non-lossless compression, such as the JPEG and MPEG compression. Because there is no transparent attribute definition in the JPEG and MPEG compression, it results in bothers to a game developer. When several colors are defined to be different transparent attribute levels and the sprite and background images are compressed into a JPEG or MPEG format, it happens that the transparent part originally presented disappears after the decompression. This is because that the cosine-transform compression used by the JPEG and MPEG, which usually has a good compressing effect to general pictures, is known as a lossy compression, and thus the transparent attribute is lost in the compression and decompression.

Therefore, it is desirable to provide an improved decompression system and method to mitigate and/or obviate the aforementioned problems.

SUMMARY OF THE INVENTION

An object of the present invention is to provide a decompression system and method for DCT-base compressed graphic data with transparent attribute, which can overcome the problem in the prior art that a typical JPEG or MPEG file cannot define the transparent attribute to thereby introduce the JPEG or MPEG compression technique into a typical game application platform.

Another object of the present invention is to provide a decompression system and method for DCT-base compressed graphic data with transparent attribute, which can efficiently compress the images since the JPEG or MPEG compression technique is introduced into the typical game application platform, thereby saving more memory or storage space than the prior art.

Accordingly to a feature of the invention, a decompression system for DCT-base compressed graphic data with transparent attribute is provided. The invention includes a memory, a memory controller, a controller, a first decompressor, a color space transformation device, a special color signal storage, a second decompressor and a first multiplexer. The memory stores a compressed graphic data and a compressed mask data corresponding to the compressed graphic data. The memory controller is connected to the memory in order to access the memory. The controller is connected to the memory controller in order to read the compressed graphic data and the compressed mask data out of the memory. The first decompressor is connected to the controller in order to decompress the compressed graphic data to thereby generate a first color space image signal. The color space transformation device is connected to the first decompressor in order to transform the first color space image signal into a second color space image signal. The special color signal storage stores a plurality of special color signals to indicate different levels of transparent attributes respectively. The second decompressor is connected to the controller in order to decompress the compressed mask data to thereby generate a select signal. The first multiplexer is connected to the controller, the color space transformation device, the special color signal storage and the second decompressor in order to select the second color space image signal or a special color signal based on the select signal for output.

Accordingly to another feature of the invention, a decompression method for DCT-base compressed graphic data with transparent attribute is provided. The method includes the steps: (A) reading a compressed graphic data and a compressed mask data out of a memory, the compressed graphic data corresponding to the compressed mask data; (B) decompressing the compressed graphic data to generate a first color space image signal; (C) transforming the first color space image signal into a second color space image signal; (D) decompressing the compressed mask data to generate a select signal; and (E) selecting the second color space image signal or a special color signal for output based on the select signal, wherein the special color signal is one of a plurality of special color signals for indicating different levels of transparent attributes.

In order to decompress the compressed mask data having a transparent attribute and corresponding to the DCT-base compressed graphic data without changing the original DCT decompression process and/or even reducing the performance, the compressed mask data with the transparent attribute has to be arranged into a sequence of each minimum compression unit (MCU) of pixels on a graphic file that are compressed by the DCT, thereby making sure that the decompressed graphic pixels and corresponding transparent mask information are concurrently present and work to each other.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
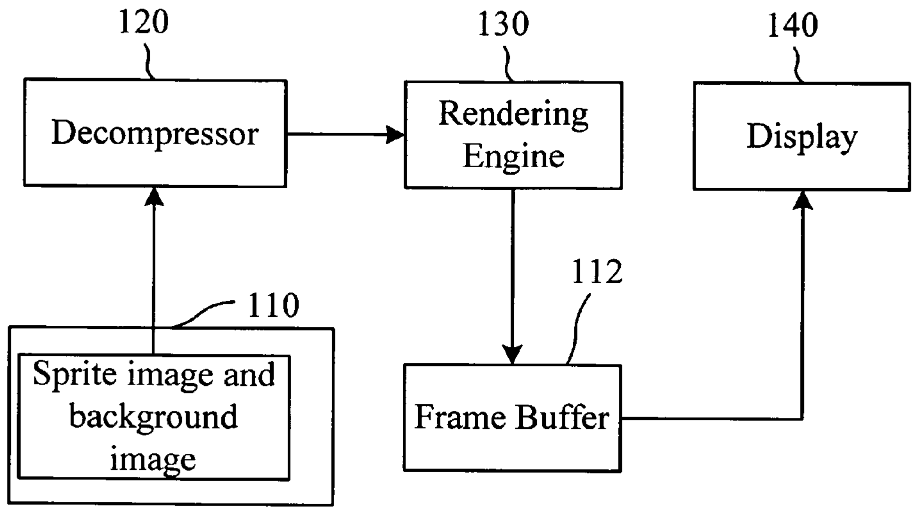
FIG. 1 (Prior Art)
FIG. 1 is a block diagram of a typical game application platform.
Figure 2:
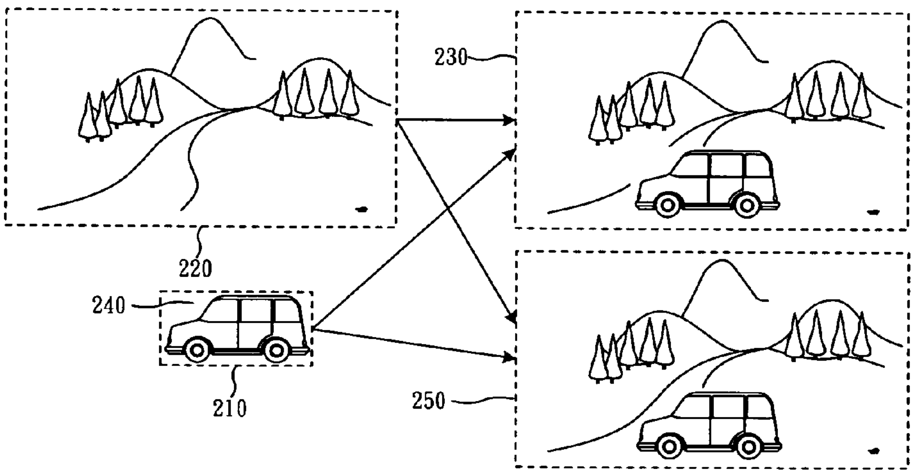
FIG. 2 (Prior Art)
FIG. 2 shows a schematic diagram of a typical superimposition of a sprite image and a background image.
Figure 3:
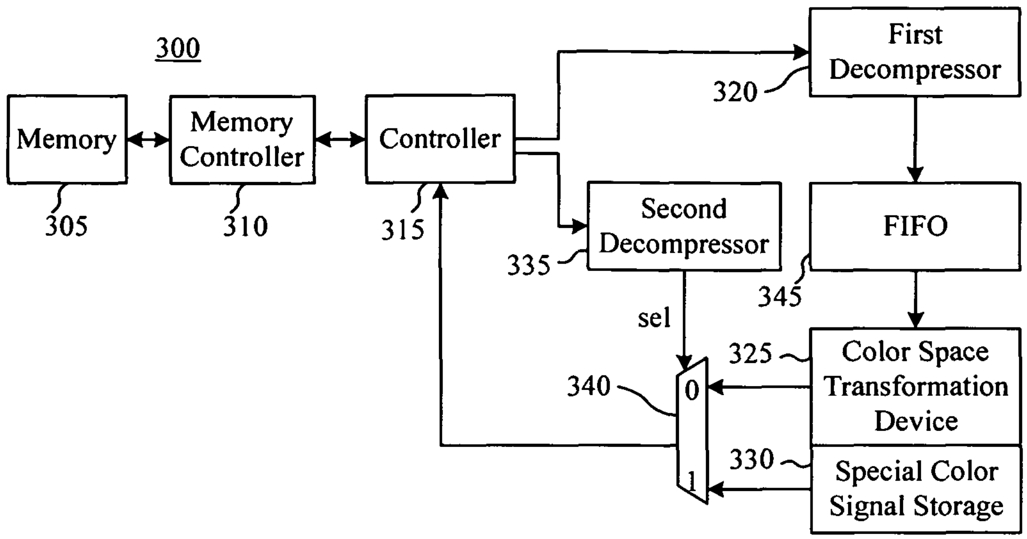
FIG. 3 is a block diagram of a decompression system for DCT-base compressed graphic data with transparent attribute according to an embodiment of the invention.

FIG. 3 is a block diagram of a decompression system 300 for DCT-base compressed graphic data with transparent attribute according to an embodiment of the invention. As shown in FIG. 3, the decompression system 300 includes a memory 305, a memory controller 310, a controller 315, a first decompressor 320, a color space transformation dKXevice 325, a special color signal storage 330, a second decompressor 335, a first multiplexer 340 and a first-in-first-out (FIFO) buffer 345.

The memory 305 stores a compressed graphic data and a compressed mask data corresponding to the compressed graphic data. The memory 305 can be an embedded SRAM or a DRAM.

The compressed graphic data is obtained by applying a DCT compression, which is a non-lossless compression. Such a compression can be a JPEG or MPEG compression. The compressed graphic data after the DCT processing, i.e., DCT-base compressed graphic data, can be a sprite or background image. The compressed mask data is obtained by applying a run-length coding, which is a lossless compression, and the transparent information is arranged in a sequence of graphic pixels that are compressed by the DCT.

The memory controller 310 is connected to the memory 305 in order to access the memory 305. When the memory 305 is the embedded SRAM, the memory controller 310 performs an SRAM access. When the memory 305 is the DRAM, the memory controller 310 performs a DRAM access.

The controller 315 is connected to the memory controller 310, in order to read the compressed graphic data and the compressed mask data out of the memory 305.

The first decompressor 320 is connected to the controller 315, in order to decompress the compressed graphic data to thereby generate a first color space image signal. The first color space image signal is a YUV image signal. When the compressed graphic data is obtained by the JPEG compression, the first decompressor 320 is preferably a JPEG decoder. When the compressed graphic data is obtained by the MPEG compression, the first decompressor 320 is preferably a MPEG decoder.

The FIFO buffer 345 is connected to the first decompressor 320 and the color space transformation device 325 in order to temporarily store the first color space image signal.

The color space transformation device 325 is connected to the first decompressor 320 in order to transform the first color space image signal into a second color space image signal.

The second color space image signal can be a RGB image signal with 5:6:5-format.

The special color signal storage 330 stores a plurality of special color signals to indicate different levels of transparent attributes. Each special color signal is a RGB image signal with 5:6:5-format.

Since the YUV or RGB color space has no transparent attribute definition, the special color signal storage 330 is employed to assign plural special color signals for indicating different levels of transparent attribute, and in this case a rendering engine (RE) can perform an alpha blending of different transparent levels in view of plural special color signals.

The second decompressor 335 is connected to the controller 315 in order to decompress the compressed mask data to thereby generate a select signal, denoted as sel. The second decompressor 335 is preferably a run-length decoder.

The first multiplexer 340 is connected to the controller 315, the color space transformation device 325, the special color signal storage 330 and the second decompressor 335, in order to select the second color space image signal or a special color signal as an output based on the select signal 'sel'.

When the select signal presents a non-zero voltage, it indicates that the position or pixel corresponding to the select signal has a transparent attribute, and the first multiplexer 340 accordingly selects the special color signal as the output. When the select signal presents a zero voltage, it indicates that the position or pixel corresponding to the select signal has a non-transparent attribute, and the first multiplexer 340 accordingly selects the second color space image signal as the output. The controller 315 writes the signal outputted by the first multiplexer 340 in the memory 305.

Figure 4:
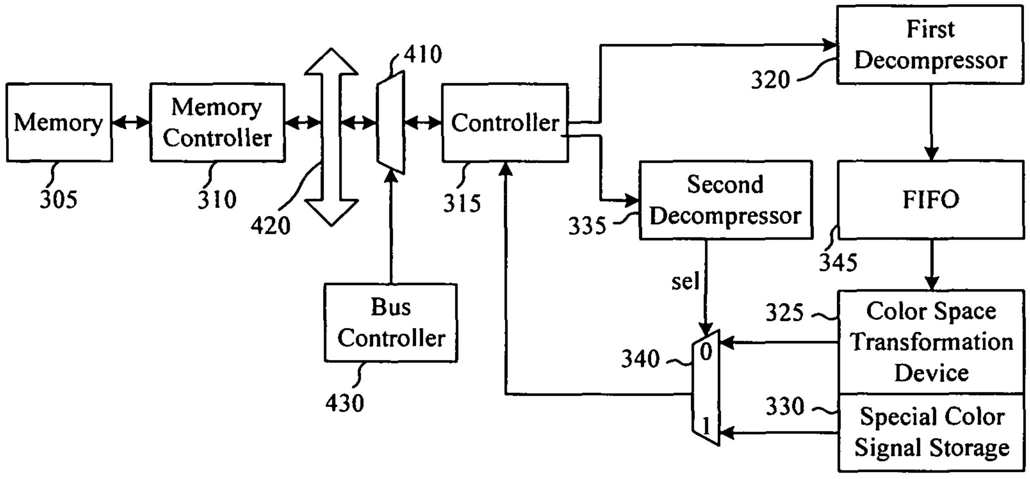
FIG. 4 is a block diagram of an application of the decompression system of FIG. 3 according to an embodiment of the invention.

FIG. 4 is a block diagram of an application of the decompression system 300 of FIG. 3 according to an embodiment of the invention. As shown in FIG. 4, for applying or integrating the decompression system 300 in an IC, a second multiplexer 410, a bus 420 and a bus controller 430 are added.

The second multiplexer 410 is connected between the memory controller 310 and the controller 315 in order to form the bus 420 between the second multiplexer 410 and the memory controller 310. In this application, the bus 420 can be a data bus with, for example, an advance microcontroller bus architecture (AMBA). The bus controller 430 is connected to the second multiplexer 410 in order to control the controller 315 to access the memory 305 through the AMBA bus 420. By means of the data bus, the decompression system 300 can be applied in a system with multiple active devices.

Figure 5:
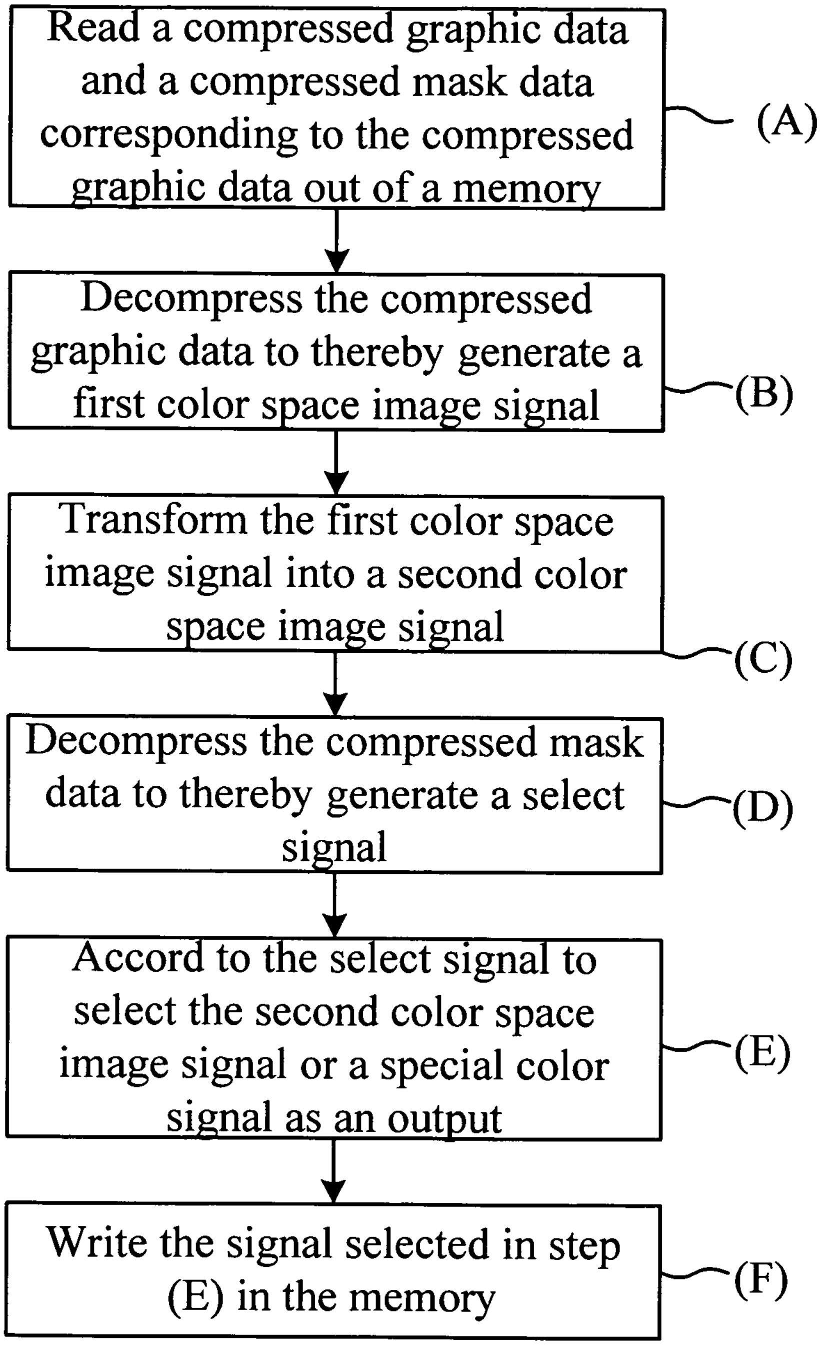
FIG. 5 is a flowchart of a decompression method for DCT-base compressed graphic data with transparent attribute according to an embodiment of the invention.

FIG. 5 is a flowchart of a decompression method for DCT-base compressed graphic data with transparent attribute according to an embodiment of the invention. As shown in FIG. 5, in step (A), a compressed graphic data and a compressed mask data are read out of a memory. The compressed graphic data corresponds to the compressed mask data and can be obtained by applying a DCT compression, which is a non-lossless compression. The compression can be a JPEG or MPEG compression. The compressed graphic data, i.e., the DCT-base compressed graphic data, can be a sprite or background image. The compressed mask data is obtained by performing a run-length coding, which is a lossless compression, on each minimum compression unit (MCU). In addition, an index and quantity set is used to indicate the successive minimum compression units with same transparent attribute.

In step (B), the compressed graphic data is decompressed to thereby generate a first color space image signal. The first color space image signal is a YUV image signal. When the compressed graphic data is obtained by the JPEG compression, the compressed graphic data is correspondingly decompressed by the JPEG decoding process. When the compressed graphic data is obtained by the MPEG compression, the compressed graphic data is decompressed by the MPEG decoding process.

In step (C), the first color space image signal is transformed into a second color space image signal. The second color space image signal is a RGB image signal 5:6:5-format.

In step (D), the compressed mask data is decompressed to thereby generate a select signal.

In step (E), according to the select signal, the second color space image signal or a special color signal is selected as an output, wherein the special color signal is directed to a level of transparent attribute. In step (F), the signal selected in step (E) is written in the memory.

Therefore, the invention records the transparent attributes of each pixel on a picture or film to form a mask of the transparent attributes, i.e., a transparent mask of the picture or film, and performs a lossless compression on the transparent mask to thereby obtain the compressed mask data while the JPEG or MPEG compression is applied to the picture or film to thereby obtain the compressed graphic data. Next, the compressed mask data is added to the compressed graphic data, which does not affect the original features of the compressed graphic data but adds the effect of transparent attribute in a JPEG or MPEG file.

For performing a lossless compression on the transparent masks, the transparent mask in each minimum compression unit of a DCT compression is performed with a run-length coding, and the adjacent blocks with same transparent mask are performed with the run-length coding again, which can essentially save the space of recording the successive blocks with same transparent attribute, such as the space of successive transparent or opaque blocks, so as to further increase the compression efficiency.

Since the compressed mask data is added to the compressed graphic data, the compressed mask data and the compressed graphic data can be decompressed concurrently. Upon the transparent mask information after the decompression, the points or pixels with transparent attributes are replaced.

As cited, the invention introduces the compressed mask data with the transparent attributes to overcome the problem in the prior art that a typical JPEG or MPEG file cannot define the transparent attribute and thus allow to introduce the JPEG or MPEG compression technique into a typical game application platform. Further, the images can be compressed efficiently to thereby save more memory than the prior art.

Although the present invention has been explained in relation to its preferred embodiment, it is to be understood that many other possible modifications and variations can be made without departing from the spirit and scope of the invention as hereinafter claimed.

What is claimed is:

1. A decompression system for DCT-base compressed graphic data with transparent attribute, comprising:

- a memory, for storing a compressed graphic data and a compressed mask data corresponding to the compressed graphic data, wherein the compressed mask data indicates a transparent mask information, and the special color signal corresponds to a transparent attribute;
- a memory controller, connected to the memory, for accessing the memory;
- a controller, connected to the memory controller, for reading the compressed graphic data and the compressed mask data out of the memory;
- a first decompressor, connected to the controller, for decompressing the compressed graphic data to generate a first color space image signal;
- a color space transformation device, connected to the first decompressor, for transforming the first color space image signal into a second color space image signal;

- a special color signal storage, for storing a plurality of special color signals to indicate different levels of transparent attributes respectively;
- a second decompressor, connected to the controller, for decompressing the compressed mask data to generate a select signal; and
- a first multiplexer, connected to the controller, the color space transformation device, the special color signal storage and the second decompressor, for selecting the second color space image signal and a special color signal for output based on the select signal.

2. The system as claimed in claim 1, wherein the controller writes the output from the first multiplexer in the memory.

3. The system as claimed in claim 2, further comprising a first-in-first-out (FIFO) buffer, connected to the first decompressor and the color space transformation device, for temporarily storing the first color space image signal.

4. The system as claimed in claim 3, further comprising a second multiplexer connected to the memory controller and the controller, for forming a bus between the second multiplexer and the memory controller.

5. The system as claimed in claim 4, further comprising a bus controller connected to the second multiplexer, for controlling the controller to access the memory through the bus.

6. The system as claimed in claim 1, wherein the compressed graphic data is obtained by a non-lossless compression.

7. The system as claimed in claim 6, wherein the non-lossless compression is a DCT compression.

8. The system as claimed in claim 1, wherein the compressed mask data is obtained by a lossless compression.

9. The system as claimed in claim 8, wherein the lossless compression is a two-stage run-length coding performed on each DCT minimum compression unit (MCU).

10. The system as claimed in claim 1, wherein the first color space image signal is a YUV image signal, and the second color space image signal and the special color signal are each an RGB image signal.

11. The system as claimed in claim 10, wherein the RGB image signal is the RGB image signal with 5:6:5-format.

12. The system as claimed in claim 10, wherein, when the transparent mask information of a pixel indicates that the pixel is transparent, the first multiplexer outputs the special color signal based on the select signal at a high voltage and when the transparent mask information of the pixel indicates that the pixel is non-transparent, the first multiplexer outputs the second color space image signal based on the select signal at a low voltage.

13. A decompression method for DCT-base compressed graphic data with transparent attribute applied in a decompression system including a memory, a memory controller connected to the memory, a controller connected to the memory controller, a first decompressor connected to the controller, a color space transformation device connected to the first decompressor, a special color signal storage, a second decompressor connected to the controller, and a first multiplexer connected to the controller, the color space transformation device, the special color signal storage and the second decompressor, the method comprising the steps of:

(A) the controller reading a compressed graphic data and a compressed mask data from the memory, the compressed graphic data corresponding to the compressed mask data, wherein the compressed mask data indicates a transparent mask information, and a special color signal corresponds to a transparent attribute from the special color signal storage;

(B) the first decompressor decompressing the compressed graphic data to generate a first color space image signal;

(C) the color space transformation device transforming the first color space image signal into a second color space image signal;

(D) the second decompressor decompressing the compressed mask data to generate a select signal; and (E) the first multiplexer selecting the second color space image signal and the special color signal for output based on the select signal for indicating different levels of transparent attributes.

14. The method as claimed in claim 13, further comprising a step of:

(F) the controller writing the second color space image signal or the special color signal selected in step (E) in the memory.

15. The method as claimed in claim 13, wherein the compressed graphic data is obtained by a non-lossless compression and the compressed mask data is obtained by a lossless compression.

16. The method as claimed in claim 15, wherein the non-lossless compression is a DCT compression.

17. The method as claimed in claim 15, wherein the lossless compression is a two-stage run-length coding performed on each DCT minimum compression unit (MCU).

18. The method as claimed in claim 13, wherein the first color space image signal is a YUV image signal, and the second color space image signal and the special color signal are RGB image signals respectively.

19. The method as claimed in claim 18, wherein the RGB image signal is the RGB image signal with 5:6:5 format.

20. The method as claimed in claim 13, wherein, when the transparent mask information of a pixel indicates that the pixel is transparent, the first multiplexer outputs the special color signal based on the select signal at a high voltage, and when the transparent mask information of the pixel indicates that the pixel is non-transparent, the first multiplexer outputs the second color space image signal based on the select signal at a low voltage.

* * * * *